US008246138B2

(12) United States Patent
Gaston et al.

(10) Patent No.: US 8,246,138 B2
(45) Date of Patent: Aug. 21, 2012

(54) PRINT EMULATION OF TEST PATTERN

(75) Inventors: Gonzalo Gaston, Barcelona (ES); Salvador Sanchez, Sabadell (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1445 days.

(21) Appl. No.: 11/825,396

(22) Filed: Jul. 6, 2007

(65) Prior Publication Data

US 2009/0010498 A1 Jan. 8, 2009

(51) Int. Cl.
*B41J 29/38* (2006.01)
*G06K 15/10* (2006.01)

(52) U.S. Cl. .......................................... 347/19; 358/1.8

(58) Field of Classification Search .................... 347/19; 358/1.15, 1.8, 1.9, 3.09
See application file for complete search history.

(56) References Cited

U.S. PATENT DOCUMENTS 5,477,246 A * 12/1995 Hirabayashi et al. ........... 347/12
5,594,840 A 1/1997 Sahay et al.
6,000,776 A 12/1999 Suzuki et al.
6,409,301 B1 * 6/2002 Takata et al. .................... 347/19
6,412,902 B2 * 7/2002 Matsumoto et al. ............ 347/19
6,450,606 B1 9/2002 Kato et al.
6,543,874 B2 4/2003 Matsumoto
6,582,048 B1 6/2003 Akahra et al.
6,591,010 B1 7/2003 Russin
6,648,444 B2 11/2003 Valero et al.
6,702,419 B2 3/2004 Stoessel et al.
6,788,434 B1 9/2004 Kanematsu et al.
6,802,580 B2 10/2004 Valero
6,827,420 B2 12/2004 Campbell et al.
6,908,171 B2 6/2005 Ward et al.
6,910,754 B2 6/2005 Gaston et al.
7,021,737 B2 4/2006 Yamada
7,050,196 B1 5/2006 Piatt et al.
7,073,883 B2 7/2006 Billow
7,104,634 B2 9/2006 Weksler et al.
2002/0101469 A1 8/2002 Wade et al.
2003/0142161 A1 7/2003 Miura et al.
2003/0147108 A1 8/2003 Gonzalez et al.
2004/0021724 A1 2/2004 Kojima
2004/0109038 A1 6/2004 Newsome et al.
2004/0169693 A1 9/2004 Nakamura
2005/0001870 A1 1/2005 Komatsu
2005/0046656 A1 3/2005 Miyasaka
2005/0099447 A1 5/2005 Hsu et al.
2005/0122364 A1 6/2005 Gardner et al.
2005/0270325 A1 12/2005 Cavill et al.
2006/0012806 A1 1/2006 Subirada et al.
2006/0033770 A1 2/2006 Yamasaki et al.
2006/0071957 A1 4/2006 Shang et al.
2006/0158477 A1 7/2006 Kusakari et al.
(Continued)

FOREIGN PATENT DOCUMENTS

EP 0917096 B1 5/1999
(Continued)

*Primary Examiner* — Benny Q Tieu
*Assistant Examiner* — Eric A Rust

(57) ABSTRACT

Print quality feedback is provided about a printer. Printer operation is monitored to determine when printer parts are not operating correctly. Information indicating which printer parts are not operating correctly is stored. A test pattern is modified to produce an emulated test pattern. The emulated test pattern emulates how the test pattern would appear when printed by the printer. The emulated test pattern includes alterations made to the test pattern based on the information indicating which printer parts are not operating correctly.

20 Claims, 4 Drawing Sheets

U.S. PATENT DOCUMENTS

| | | | | |
|---|---|---|---|---|
| 2006/0274107 | A1 | 12/2006 | Anderson et al. | |
| 2007/0008369 | A1 | 1/2007 | Suzuki | |
| 2007/0024664 | A1 | 2/2007 | Shang et al. | |
| 2007/0070109 | A1 | 3/2007 | White et al. | |
| 2007/0070111 | A1 | 3/2007 | Vladislav | |
| 2007/0291287 | A1 * | 12/2007 | Snyder et al. | 358/1.9 |
| 2008/0144076 | A1 * | 6/2008 | Boliek et al. | 358/1.15 |

FOREIGN PATENT DOCUMENTS

| | | | |
|---|---|---|---|
| WO | WO 2007/039445 | A1 | 4/2007 |

* cited by examiner

PRINT EMULATION OF TEST PATTERN

BACKGROUND

In printers, print quality can degrade for a variety of reasons. For example, in ink jet printers, nozzles that fire ink can dry out either through not being used over extended periods of time, or just in the course of normal operation. Some printers include automatic nozzle firing detection. For example, during a test cycle before printing, the printer can monitor ejection of ink into a spittoon in order to verify proper operation of each print nozzle. The information generated by automatic nozzle firing detection can be used to trigger a printhead recovery sequence or trigger a warning message to a user.

Many printers also allow a user to print out a print pattern than can aid users in visually diagnosing print quality. This is an especially useful feature for users who want to see the effect on print quality when one or more nozzles of a printhead are not operating properly. For a desktop printer with six hundred nozzles, a 20 centimeter by 2 centimeter space can be sufficient to produce a readable test pattern. For a twelve-color printer with more than fourteen thousand nozzles, a 20 centimeter by 20 centimeter space may be required to produce a readable test pattern. For a twelve-color printer with thirty to sixty thousand nozzles printer, a much larger area may be required to produce a readable test pattern.

DESCRIPTION OF THE EMBODIMENT

Figure 1:
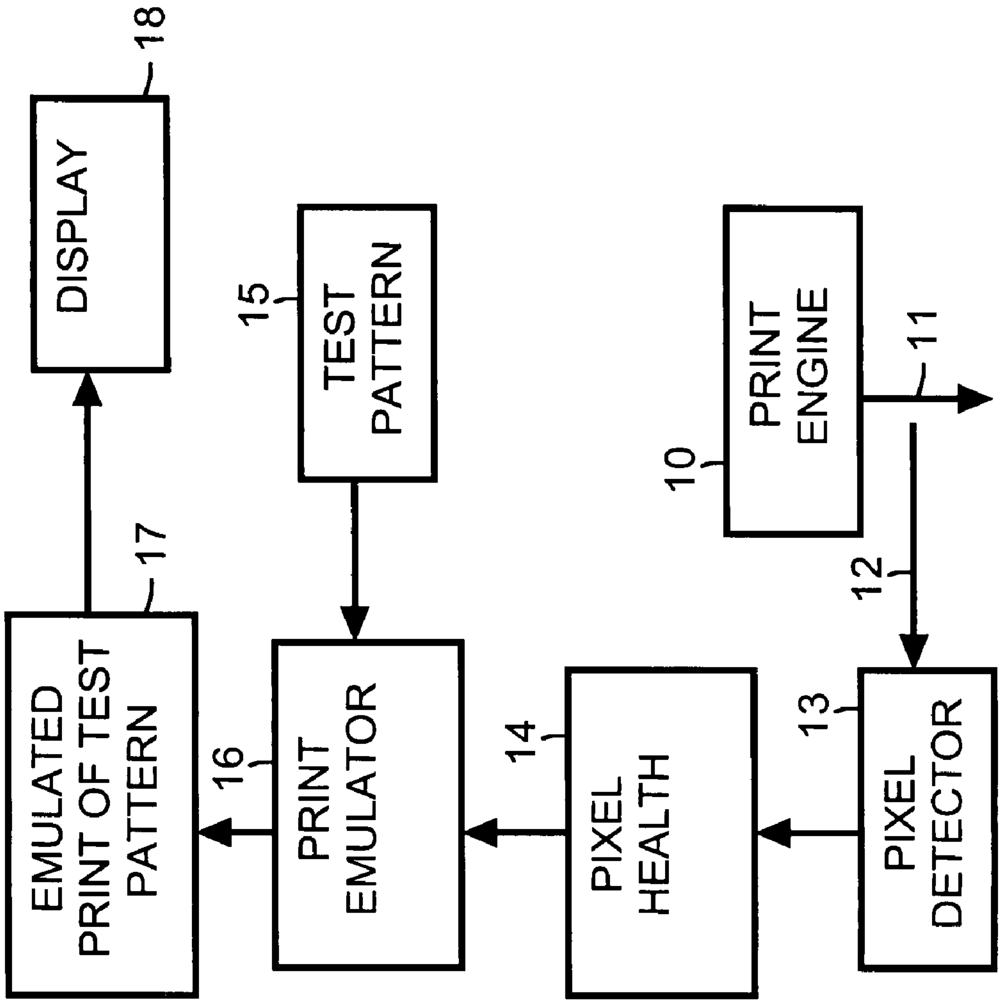
FIG. 1 is a simplified block diagram of a system that provides print emulation of a test pattern in accordance with an embodiment of the present invention.

FIG. 1 is a simplified block diagram of a system that provides print emulation of a test pattern. Print engine 10 deposits colorant on media, as represented by an arrow 11. Pixel detector system 13 detects print quality of printed pixels, as represented by an arrow 11. For example, for an inkjet printer, pixel detector system 13 optically monitors an ink stream ejected from each nozzle in a printhead to confirm proper operation of the nozzle. Alternatively, pixel detector system 13 can be any type of system that can determine print quality of pixels deposited by a printer.

Information on pixel quality for pixels is stored as print health information 14. For example, for an inkjet printer, print health information 14 includes information indicating which nozzles are not firing ink, which nozzles are firing a reduced amount of ink and which nozzles are firing ink in a wrong direction. In other types of printers, other printer parts may be monitored to determine print health. For example, in a laser printer using multiple lasers, laser operation can be monitored instead of nozzle operation.

A print emulator 16 receives a test pattern 15 and produces an emulated print 17 of test pattern 15. This emulated print 17 is forwarded to a display 18 for view by a user of the printer. For example, display 18 is a display on a printer, or is a computer monitor of a computing system that is in communication with the printer. Alternatively, display 18 is a display of a computer system that has received a copy of emulated print 17.

When producing emulated print 17 of test pattern 15, print emulator 16 modifies test pattern 15 in accordance with print health information 14. For example, when producing emulated print 17 for an inkjet printer, print emulator omits or alters pixels that would be printed by nozzles that are not firing ink. Likewise, when producing emulated print 17, print emulator 16 omits or alters pixels that would be printed by nozzles that are firing a reduced amount of ink or are firing ink in the wrong direction. This alteration of test pattern 15 is for the purpose of allowing a user who views emulated print 17 to visually see how defects in pixel quality will affect print quality. This is done without the necessity of actually printing test pattern 15 on media.

Providing emulated print 17 to a user on a display, rather than printing test pattern 15, can save time and prevent waste of media. It can save time because it is not necessary for a printer to warm up and turn on accessories such as fans and heaters. It can save print media because no printing is performed and therefore no media is utilized.

Providing emulated print 17 to a user on a display 18 can provide information to a user in a more useful format than printing test pattern 15 on media. For example, when providing emulated print 17 to a user on a display 18, various close-up views can be provided. When test pattern 15 is printed on media, a magnified glass or other optical device would be necessary to obtain a more detailed view of print quality.

In addition to, or instead of, providing emulated print 17 to a user on display 18, emulated 17 can also be forwarded to others, such as service personnel, to evaluate the functionality of the printer.

For example, print engine 10, pixel detector 13, print emulator 16 and display 18 can all reside within a printer. Alternatively, some of the functionality can reside outside the printer itself. For example, display 18 or both display 18 and print emulator 16 can reside in a computing system with access to the printer while print engine 10 and pixel detector 13 reside within the printer.

Figure 2:
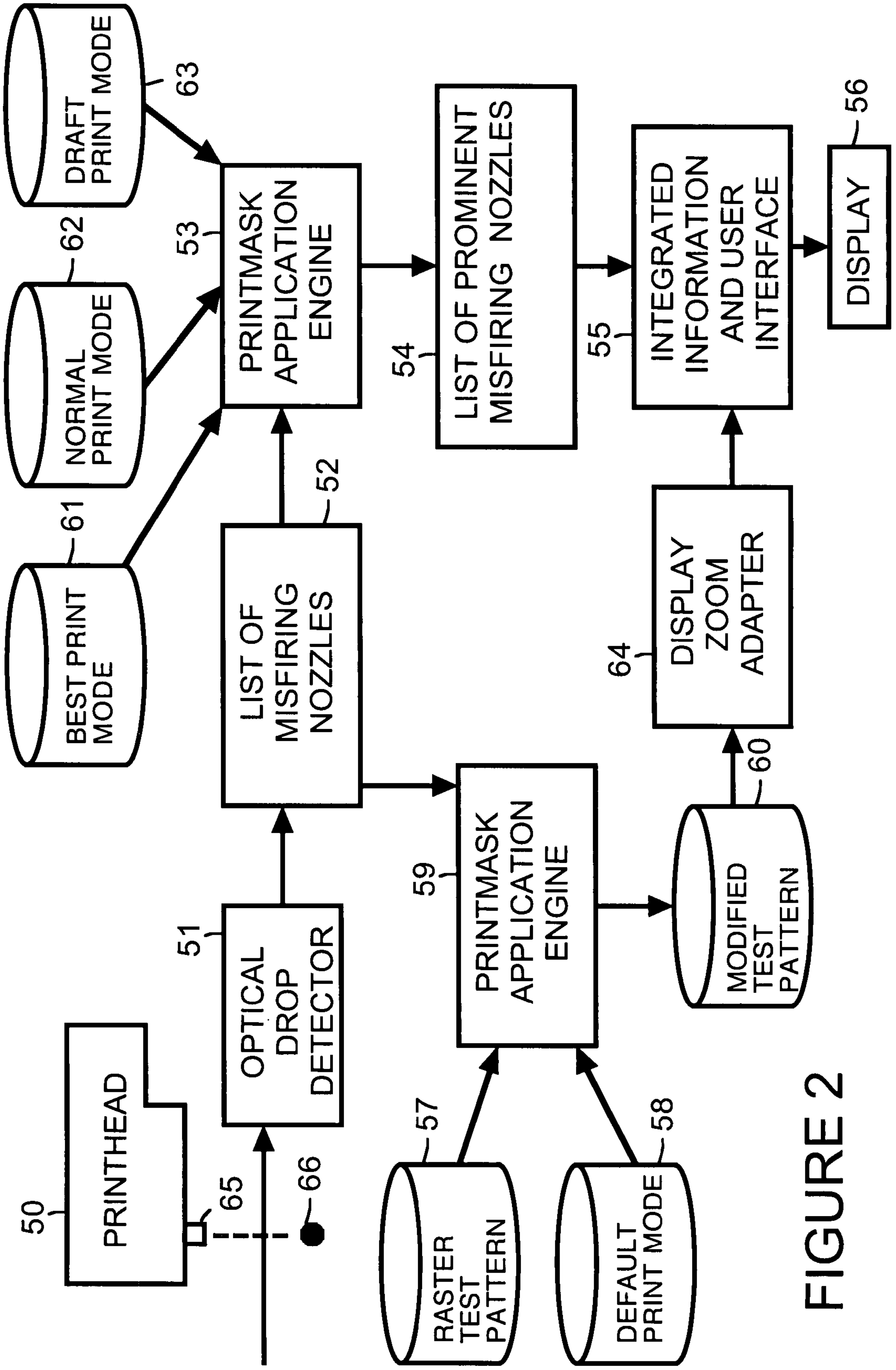
FIG. 2 is a simplified block diagram of a system that provides print emulation of a test pattern in accordance with another embodiment of the present invention.

FIG. 2 is a simplified block diagram of a system that provides print emulation of a test pattern for an inkjet printer. A printhead 50 include nozzles that eject ink, as represented by a nozzle 65 ejecting an ink drop 66. An optical drop detector 51 detects ejected ink. This is done for every nozzle in printhead 50 to confirm proper operation of the nozzles. For example, optical drop detector 51 can be used when printhead 50 ejects ink into a spittoon. The information on each nozzle detected by optical drop detector 51 is used to create a list of misfiring nozzles 52. The information in list of misfiring nozzles 52 includes, for example, information indicating which nozzles are not firing ink, which nozzles are firing a reduced amount of ink and which nozzles are firing ink in a wrong direction.

The list of misfiring nozzles 52 is made available to a printmask application engine 59. Printmask application engine 59 is a print engine that receives a raster test pattern 57 and default print mode information 58. For example, raster test pattern 57 is an ideal pattern that shows what printing should look like when all nozzles are functioning correctly. Raster test pattern 57 is, for example, a stair step pattern or some other pattern that can indicate nozzle health to a user.

Default print mode information 58 indicates how nozzles would be used to print raster test pattern 57. For example, default print mode information 58 indicates a single pass print mask is generated where each nozzle for each color is used to print a single row of pixels for that color.

Printmask application engine 59 uses raster test pattern 57, default print mode information 59 and list of misfiring nozzles 52 to generate a modified test pattern 60. For example, when producing modified test pattern 60, printmask application engine 59 omits or alters pixels that would be printed by nozzles that are not firing ink. Likewise, when producing modified test pattern 60. printmask application engine 59 omits or alters pixels that would be printed by nozzles that are firing a reduced amount of ink or are firing ink in the wrong direction. This will allow a user to visually see how non-firing or misfiring nozzles will affect print quality without the necessity of actually printing on media.

A display zoom adapter 64 receives modified test pattern 60 and at the direction of an integrated information and user interface 55, modifies the modified test pattern 60 to allow zoom-in on a selected portion of modified test pattern 60.

A printmask application engine 53 receives best print mode information 61, normal print mode information 62, draft print mode information 63 and list of prominent misfiring nozzles 52 and generates a list of prominent misfiring nozzles 54. Prominent misfiring nozzles 54 are those misfiring nozzles for each print mode that are likely to create a user-visible print artifact. List of prominent misfiring nozzles 54 is helpful for printers using multi-pass print modes because defective nozzles can affect print quality differently dependent upon the number of print passes and how the defective nozzles are used or not used in each pass. While FIG. 2 shows print mask application engine 53 as a separate entity from print mask application engine 59, in alternative embodiments the functionality of printmask application engine 53 can be integrated into printmask application engine 59.

Integrated information and user interface 55 receives information from display zoom adapter 64 and places the information on a display 56. When applicable, integrated information and user interface 55 modifies the information from display zoom adapter 64 based on list of prominent misfiring nozzles 54, dependent upon a print mode selected by the user.

Figure 3:
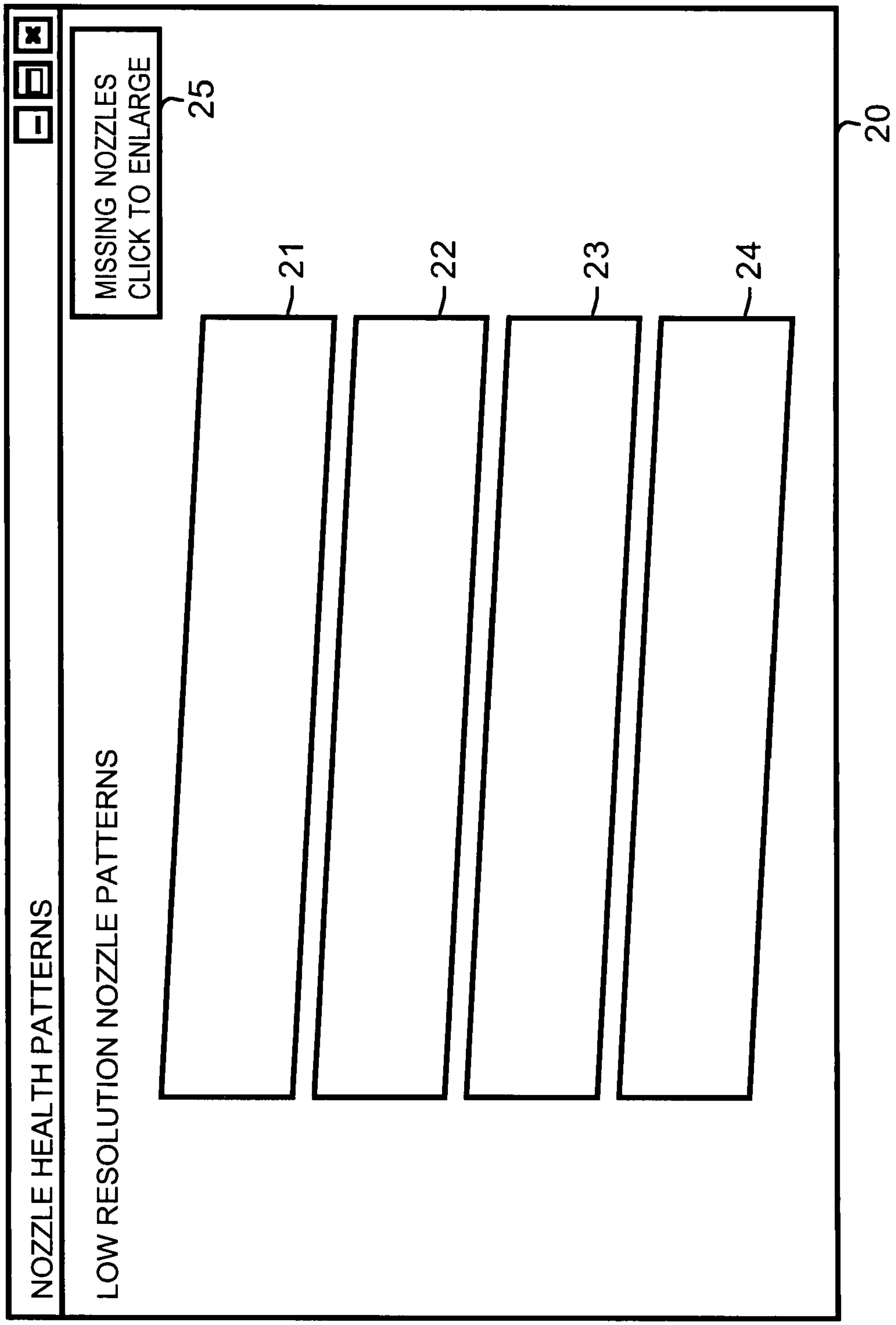
FIG. 3 is a simplified screen shot of an emulated test pattern displayed to a user in accordance with an embodiment of the present invention.

FIG. 3 shows a simplified screen shot 20 of an emulated test pattern displayed to a user on display 18. The emulated test pattern shows the effect that non-firing and misfiring nozzles will have on print quality.

As will be understood by persons of ordinary skill in the art, the emulated test pattern could be any test pattern useful to display print quality. A simple example of a test pattern is shown in FIG. 3 only for illustrative purposes. For example, as shown in FIG. 3, the emulated test pattern includes a band of color 21, a band of color 22, a band of color 23 and a band of color 24. For example, bands of color 21 through 23 could include bands of blue, magenta, yellow and black. Alternatively, bands 21 through 24 could contain any combinations of color. These bands of color are altered to show the effect that non-firing and misfiring nozzles will have on print quality.

A message 25 informs a user that by placing a cursor over a location in one of color bands 21 through 24 and using a point device, such as a mouse, to make a selection (click), a user can get an enlarged view of the region clicked by the user.

Figure 4:
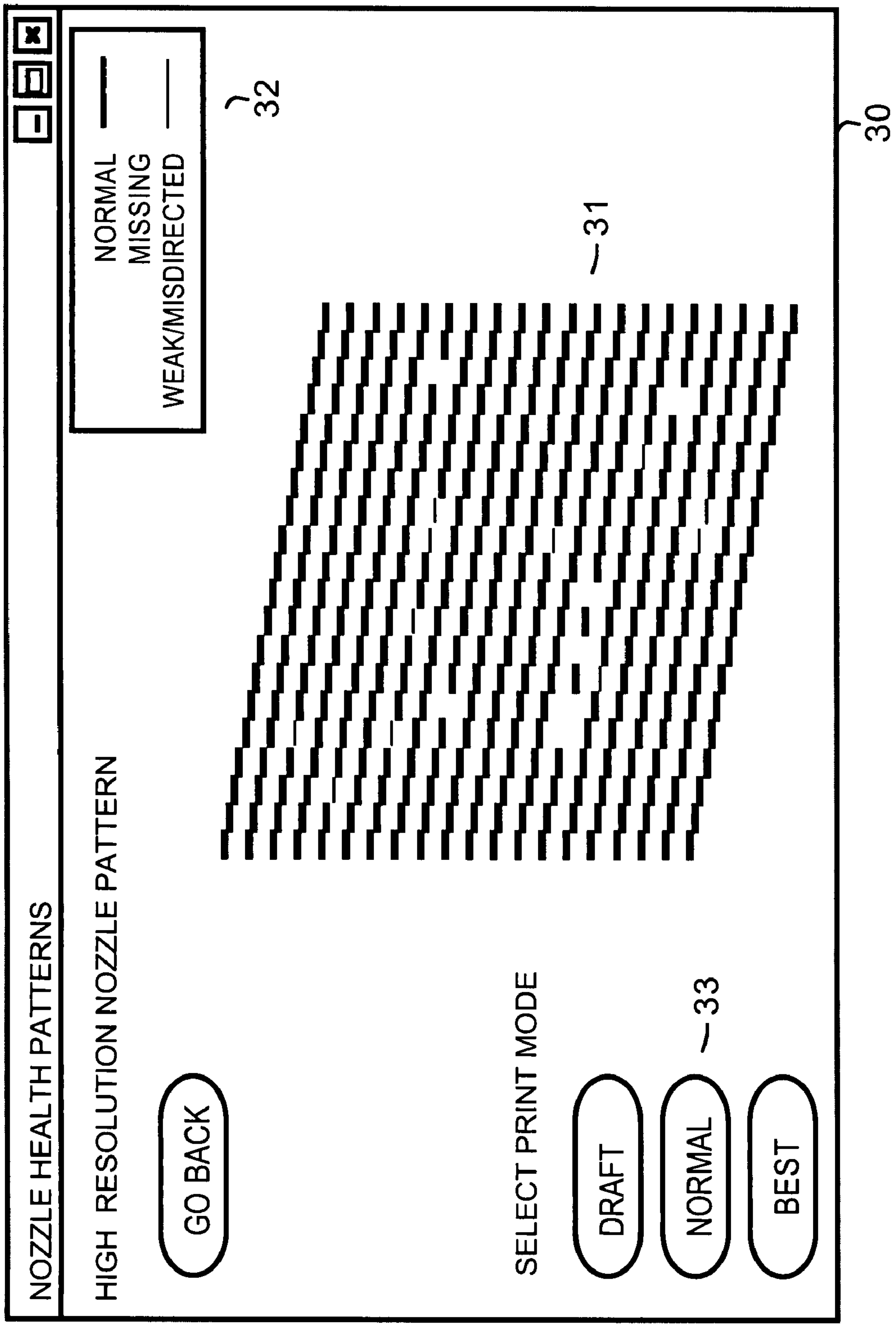
FIG. 4 is a simplified screen shot of an enlarged view of a portion of an emulated test pattern displayed to a user in accordance with an embodiment of the present invention.

FIG. 4 shows a simplified screen shot 30 of an enlarged view of a portion 31 of the emulated test pattern shown in FIG. 3. A box 32 provides a key for a user to recognize how incorrectly operating nozzles will result in missing or weak pixels when printing.

Since print mode can affect things like firing frequency, firing order and so on of how print nozzles place ink on media, a different close up nozzle print pattern can be provided dependent upon whether the printer is printing in a print mode, a normal mode or a best node, as illustrated by buttons 33.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method of providing print quality feedback about a printer, comprising:

monitoring a printhead of the printer to determine when nozzles on the printhead are not operating correctly;

storing information indicating which nozzles are not operating correctly; and, modifying a test pattern to produce an emulated test pattern, the emulated test pattern emulating how the test pattern would appear when printed by the printer, the emulated test pattern including alterations made to the test pattern based on the information indicating which nozzles are not operating correctly.

2. A method as in claim 1 additionally comprising:

displaying on a display the emulated test pattern.

3. A method as in claim 1 additionally comprising:

displaying on a display the emulated test pattern; and, displaying on the display a close-up of a portion of the emulated test pattern in response to a user selection.

4. A method as in claim 1 additionally comprising:

allowing a user to select a print mode to use when producing the emulated test pattern so that for a selected print mode the test pattern is modified to reflect print artifacts that are likely to be caused by the nozzles that are not operating correctly.

5. A printer system, comprising:

a printhead that includes nozzles for placing ink on media;

print health detector that detects when nozzles on the printhead are not operating correctly; and, a print emulator that modifies a test pattern to produce an emulated test pattern, the emulated test pattern emulating how the test pattern would appear when printed by the printer, the emulated test pattern including alterations made to the test pattern based on information generated by the print health detector indicating which nozzles are not operating correctly.

6. A printer system as in claim 5 additionally comprising:

a display that displays the emulated test pattern.

7. A printer system as in claim 5 additionally comprising:

a display that displays the emulated test pattern, wherein in response to a user selection the display displays a portion of the emulated test pattern in response to a user selection.

8. A printer system as in claim 5 additionally comprising:

a display that displays the emulated test pattern, wherein the display allows a user to select a print mode to use when producing the emulated test pattern.

9. A printer system as in claim 5 wherein the print health detector comprises an optical drop detector.

10. A print system as in claim 5 wherein the print emulator comprises:

a first print engine that modifies the test pattern to produce a modified test pattern that represents printing the test pattern with a default print mode; and, a second print engine that identifies nozzles on the printhead not operating correctly that are likely to create a user-visible print artifact in print modes other than the default print mode.

11. A print system as in claim 5 wherein the print emulator comprises:

a first print engine that modifies the test pattern to produce a modified test pattern that represents printing the test pattern with a single pass print mode; and, a second print engine that identifies nozzles on the printhead not operating correctly that are likely to create a user-visible print artifact in multiple pass print modes.

12. A print system as in claim 5 wherein the print emulator comprises:

a print engine that modifies the test pattern to produce a modified test pattern that represents printing the test pattern; and, a display zoom adapter that receives the modified test pattern and additionally modifies the modified test pattern to allow zoom-in on a selected portion of modified test pattern when displayed on a display.

13. A print system as in claim 5 wherein the print emulator comprises:

a display;

a first print engine that modifies the test pattern to produce a modified test pattern that represents printing the test pattern with a single pass print mode;

a second print engine that identifies nozzles on the printhead not operating correctly that are likely to create a user-visible print artifact in multiple pass print modes;

a display zoom adapter that receives the modified test pattern and additionally modifies the modified test pattern to allow zoom-in on a selected portion of modified test pattern when displayed on a display; and, an integrated information and user interface that receives information from the display zoom adapter and places the information on the display, the integrated information and user interface modifies the information from display zoom adapter based on the nozzles identified by the second print engine, dependent upon a print mode selected by a user selection.

14. A system that provides print quality feedback about a printer, comprising:

a detector that detects when parts of the printer are not operating correctly; and, means for modifying a test pattern to produce an emulated test pattern, the emulated test pattern emulating how the test pattern would appear when printed by the printer, the emulated test pattern including alterations made to the test pattern based on information generated by the detector.

15. A system as in claim 14 additionally comprising:

means for displaying the emulated test pattern to a user.

16. A system as in claim 14 additionally comprising:

means for displaying the emulated test pattern to a user, including means for displaying a portion of the emulated test pattern in response to a user selection.

17. A system as in claim 14 additionally comprising:

means for displaying the emulated test pattern to a user, including means for allowing a user to select a print mode to use when producing the emulated test pattern.

18. A system as in claim 14 wherein the detector comprises means for optically detecting drops emitted from nozzles on a printhead of the printer.

19. A method of providing print quality feedback about a printer, comprising:

monitoring printer operation to determine when printer parts are not operating correctly;

storing information indicating which printer parts are not operating correctly; and, modifying a test pattern to produce an emulated test pattern, the emulated test pattern emulating how the test pattern would appear when printed by the printer, the emulated test pattern including alterations made to the test pattern based on the information indicating which printer parts are not operating correctly.

20. A method as in claim 19 wherein the printer parts are nozzles within a printhead of an inkjet printer.

* * * * *